Dec. 2, 1947.  R. C. BOUR  2,431,676
DISPENSING CONTAINER FOR ACETYLENE AND METHOD FOR STORING ACETYLENE
Filed Nov. 23, 1944
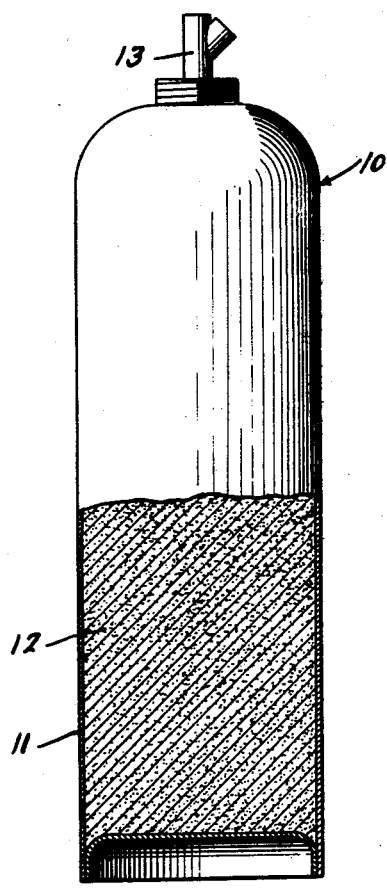
Inventor
Robert C. Bour
by The Firm of Charlesw Hills Attys.

Patented Dec. 2, 1947

2,431,676

UNITED STATES PATENT OFFICE 2,431,676

DISPENSING CONTAINER FOR ACETYLENE AND METHOD FOR STORING ACETYLENE

Robert C. Bour, Chicago, Ill., assignor to National Cylinder Gas Company, Chicago, Ill., a corporation of Delaware Application November 23, 1944, Serial No. 564,903

11 Claims. (Cl. 206—0.7)

This invention relates to the storing of acetylene under pressure in cylinders or receptacles filled with a solid absorbent material impregnated with an acetylene solvent. Hitherto the solvent used for this purpose has been acetone, but the use of this substance is associated with certain disadvantages arising from its ready volatility. For instance, on rapid discharge of acetylene from a filled cylinder as much as 3% or 4% of the acetone is lost. Further, chilling of the cylinder due to evaporation of acetone on discharge of acetyelene cools the cylinder to the point where the solubility of the acetylene in the acetone is appreciably increased. As a consequence, relatively large amounts of acetylene gas are retained in the cylinder instead of being discharged.

It is therefore an important object of the present invention to provide improved means and methods for storing acetylene under pressure in cylinders.

A more specific object of the present invention is to provide novel solvents for acetylene that are not lost from a pressure cylinder on rapid discharge of acetylene.

Other and further objects and features of the present invention will become apparent from the following disclosure and appended claims.

According to the present invention, acetylene is stored under pressure in cylinders or receptacles containing a suitable porous absorbent such as the filler disclosed in the patent to Smith No. 1,332,525 comprising Portland cement, diatomaceous earth, asbestos fiber, charcoal and water. This or some other equivalent absorbent filler is impregnated with a solvent for acetylene which is selected from the esters of phosphoric acid derived from alcohols containing not more than six carbon atoms. Examples of such esters are trimethyl phosphate, triethyl phosphate, tri-isopropyl phosphate, tributyl phosphate, triamyl phosphate, trihexyl phosphate and tribenzyl phosphate. Trimethyl phosphate is the preferred solvent.

As is usual in acetylene storage technique, the gas should be dried before contact with a solvent; preferably it should be passed over calcium chloride before and after compression. The usual pressures may be employed, namely from 10 to 30 atmospheres. The amount of acetylene dissolved is the same as that usually taken up by conventional volatile solvents such as acetone.

The loss of phosphate ester solvents on rapid discharge of acetylene from storage cylinders is but a fraction of the loss noted when acetone is employed as the solvent. For instance, in the case of a cylinder containing the above identified conventional filler impregnated with 58.5 pounds trimethyl phosphate having dissolved therein 20 pounds acetylene, 14.2 pounds acetylene was discharged within 4½ hours with a loss of only 0.02 pound of trimethyl phosphate. When the same cylinder was impregnated with 38 pounds acetone and charged with 20.9 pounds of acetylene, the discharge of 14.3 pounds acetylene in 4½ hours was accompanied by a loss of 1 pound of acetone. Similar results are obtained in the case of the other disclosed phosphoric acid esters.

The accompanying drawing is a side elevational view, with parts shown in vertical longitudinal section, of an acetylene container according to the present invention. In the drawing, the container is generally indicated by the reference numeral 10. As shown, the container includes a generally cylindrical or tubular metal container having walls 11 and filled with a solid absorbent material 12 impregnated with an ester of phosphoric acid derived from an alcohol containing not more than 6 carbon atoms. Charging and discharging is effected through an uppermost bifurcated hollow neck portion 13 containing, in the vertical branch thereof, a needle valve (not shown) or the like, for controlling the flow of gas through the neck ahead of the bifurcation and through the other branch.

Many details of composition and procedure may be varied within a wide range without departing from the principles of this invention, and it is therefore not my intention to limit the patent granted on this invention otherwise than necessitated by the scope of the appended claims.

I claim as my invention:

1. Means for storing acetylene under pressure comprising a receptacle containing a solid absorbent impregnated with an ester of phosphoric acid derived from an alcohol containing not more than 6 carbon atoms.

2. Means for storing acetylene under pressure comprising a receptacle containing a solid absorbent impregnated with trimethyl phosphate.

3. In combination, receptacle capable of being closed and of withstanding internal pressure, packing of solid absorbent impregnated with a solvent comprising an ester of phosphoric acid derived from an alcohol containing not more than 6 carbon atoms, and acetylene in solution in said solvent under pressure.

4. In combination, a receptacle capable of being closed and of withstanding internal pressure, a packing of solid absorbent impregnated with trimethyl phosphate, and acetylene in solution in said trimethyl phosphate under pressure.

5. In combination, a receptacle capable of being closed and of withstanding internal pressure, a packing of solid absorbent impregnated with triethyl phosphate, and acetylene in solution in said triethyl phosphate under pressure.

6. In combination, a receptacle capable of being closed and of withstanding internal pressure, a packing of solid absorbent material impregnated with tri-isopropyl phosphate, and acetylene in solution in said tri-isopropyl phosphate under pressure.

7. The method of storing acetylene which comprises providing a solid absorbent, impregnating the solid absorbent with an ester of phosphoric acid derived from an alcohol containing not more than six carbon atoms and dissolving acetylene in the impregnated absorbent.

8. The method of storing acetylene which comprises providing a solid absorbent, impregnating the solid absorbent with trimethyl phosphate and dissolving acetylene in the impregnated absorbent.

9. The method of storing acetylene which comprises providing a solid absorbent, impregnating the solid absorbent with triethyl phosphate and dissolving acetylene in the impregnated absorbent.

10. The method of storing acetylene which comprises providing a solid absorbent, impregnating the solid absorbent with tri-isopropyl phosphate and dissolving acetylene in the impregnated absorbent.

11. The method of storing acetylene which comprises providing a porous absorbent material bonded with Portland cement, impregnating said absorbent material with phosphoric acid ester derived from an alcohol containing not more than six carbon atoms and passing acetylene under pressure into contact with the impregnated absorbent material.

ROBERT C. BOUR.

REFERENCES CITED

The following references are of record in the file of this patent:

UNITED STATES PATENTS

| Number | Name | Date |
|---|---|---|
| 1,234,600 | Allen | July 24, 1917 |
| 1,332,525 | Smith | Mar. 2, 1920 |
| 1,407,588 | Skinner et al. | Feb. 21, 1922 |
| 1,863,501 | Roffey | June 14, 1932 |

FOREIGN PATENTS

| Number | Country | Date |
|---|---|---|
| 264,846 | Great Britain | Aug. 25, 1927 |